US012699205B2

(12) United States Patent
Thompson et al.

(10) Patent No.: US 12,699,205 B2
(45) Date of Patent: *Aug. 4, 2026

(54) LOCATION-BASED FORECASTING OF WEATHER EVENTS BASED ON USER IMPACT

(71) Applicant: THE WEATHER COMPANY, LLC, Brookhaven, GA (US)

(72) Inventors: Rodney Thompson, Pelham, NH (US); Douglas George Dempster, Andover, MA (US); James John Politis, Windham, NH (US); Ronald Harris, Bedford, NH (US); Tanya Simkhovich, North Andover, MA (US); Frederick Scott Eliot, Newbury, MA (US)

(73) Assignee: THE WEATHER COMPANY, LLC, Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,870

(22) Filed: May 22, 2024

(65) Prior Publication Data

US 2024/0361495 A1 Oct. 31, 2024

Related U.S. Application Data

(63) Continuation of application No. 16/798,596, filed on Feb. 24, 2020, now Pat. No. 12,025,769.

(51) Int. Cl.
G01W 1/10 (2006.01)

(52) U.S. Cl.
CPC .................................... G01W 1/10 (2013.01)

(58) Field of Classification Search
CPC ..... G01W 1/10; G01W 2203/00; Y02A 90/10
See application file for complete search history.

(56) References Cited

U.S. PATENT DOCUMENTS

| | | | | |
|---|---|---|---|---|
| 6,278,375 | B1 * | 8/2001 | Hucker | .................. G08B 21/10 |
| | | | | 340/2.1 |
| 7,058,510 | B2 | 6/2006 | Kelly et al. | |
| 7,558,675 | B2 | 7/2009 | Sugiura | |
| 8,874,288 | B1 | 10/2014 | Siddiqui | |
| 9,246,610 | B2 * | 1/2016 | Johnson | ............... G08B 27/006 |
| 10,019,888 | B2 * | 7/2018 | Bonner | .................. G08B 21/24 |

(Continued)

FOREIGN PATENT DOCUMENTS

| | | | | |
|---|---|---|---|---|
| CN | 106950612 B | * | 7/2019 | .............. G01W 1/06 |
| WO | WO2016151061 A1 | | 9/2016 | |

*Primary Examiner* — Eyob Hagos
(74) *Attorney, Agent, or Firm* — Barnes & Thornburg LLP

(57) ABSTRACT

A computer system provides location-based weather services. Weather data is processed to determine one or more weather values for a location. The one or more weather values are compared to baseline weather data for the location to identify a weather event, wherein the weather event is identified in response to determining that the one or more weather values deviate from a corresponding one or more baseline values of the baseline weather data by a threshold amount. A request is received from a user device for weather information for the location. Information relating to the weather event is provided to the user device. Embodiments of the present invention further include a method and program product for providing location-based weather services in substantially the same manner described above.

20 Claims, 5 Drawing Sheets

(56)         References Cited

U.S. PATENT DOCUMENTS

| | | | |
|---|---|---|---|
| 10,452,253 B2 | 10/2019 | Yang et al. | |
| 10,529,233 B1 | 1/2020 | Vieten et al. | |
| 11,237,299 B2 * | 2/2022 | Chen | G06F 16/5866 |
| 2005/0258971 A1 * | 11/2005 | Greenstein | G01W 1/16 |
| | | | 340/601 |
| 2006/0095210 A1 | 5/2006 | Chan | |
| 2006/0267783 A1 * | 11/2006 | Smith | G01W 1/00 |
| | | | 340/601 |
| 2007/0049260 A1 * | 3/2007 | Yuhara | H04L 67/52 |
| | | | 455/414.3 |
| 2007/0230537 A1 | 10/2007 | Tangborn | |
| 2011/0128144 A1 * | 6/2011 | Baron, Sr. | G08B 21/10 |
| | | | 340/539.3 |
| 2014/0055272 A1 * | 2/2014 | Mccormick | G01W 1/10 |
| | | | 340/601 |
| 2014/0189584 A1 * | 7/2014 | Weng | G06F 3/04883 |
| | | | 715/833 |
| 2015/0025924 A1 | 1/2015 | Yun | |
| 2015/0256277 A1 | 9/2015 | Johnson et al. | |
| 2016/0061992 A1 * | 3/2016 | Miller | G01W 1/10 |
| | | | 702/3 |
| 2016/0169539 A1 | 6/2016 | Deivasigamani et al. | |
| 2016/0238740 A1 | 8/2016 | Yu et al. | |
| 2016/0300172 A1 | 10/2016 | Bangalore et al. | |
| 2017/0017014 A1 | 1/2017 | Kleeman et al. | |
| 2018/0268332 A1 * | 9/2018 | Rainey | G06F 16/9537 |
| 2019/0080801 A1 | 3/2019 | Klos et al. | |
| 2019/0109976 A1 * | 4/2019 | Wolfinger | G01W 1/10 |
| 2020/0231298 A1 * | 7/2020 | Bilek | B64D 43/00 |
| 2022/0114873 A1 | 4/2022 | Williams | |

* cited by examiner

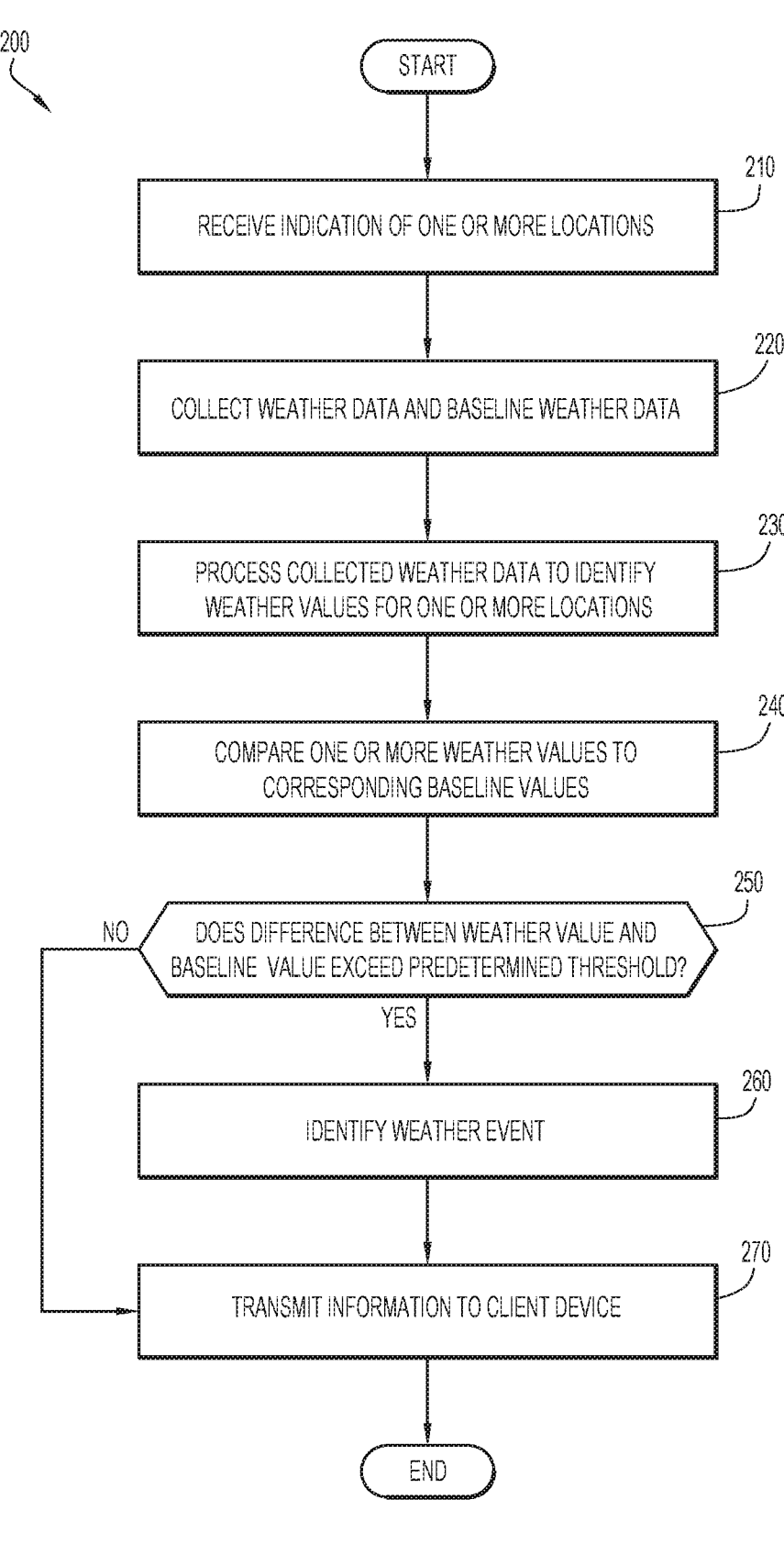

200

START

RECEIVE INDICATION OF ONE OR MORE LOCATIONS — 210

COLLECT WEATHER DATA AND BASELINE WEATHER DATA — 220

PROCESS COLLECTED WEATHER DATA TO IDENTIFY WEATHER VALUES FOR ONE OR MORE LOCATIONS — 230

COMPARE ONE OR MORE WEATHER VALUES TO CORRESPONDING BASELINE VALUES — 240

DOES DIFFERENCE BETWEEN WEATHER VALUE AND BASELINE VALUE EXCEED PREDETERMINED THRESHOLD? — 250

NO

YES

IDENTIFY WEATHER EVENT — 260

TRANSMIT INFORMATION TO CLIENT DEVICE — 270

END

FIG.2

LOCATION-BASED FORECASTING OF WEATHER EVENTS BASED ON USER IMPACT

CROSS REFERENCE TO RELATED APPLICATION

This application is a continuation of U.S. patent application Ser. No. 16/798,596, filed Feb. 24, 2020, which is incorporated herein by reference in its entirety.

BACKGROUND

1. Technical Field

Present invention embodiments relate to location-based weather services, and more specifically, to providing location-based forecasting of weather and other events based on their impact to users.

2. Discussion of the Related Art

Weather services, such as websites, software applications (including mobile applications), and other media, provide weather data to consumers that can include both current weather conditions and forecasts for future weather conditions.

SUMMARY

According to one embodiment of the present invention, a computer system provides location-based weather services. Weather data is processed to determine one or more weather values for a location. The one or more weather values are compared to baseline weather data for the location to identify a weather event, wherein the weather event is identified in response to determining that the one or more weather values deviate from a corresponding one or more baseline values of the baseline weather data by a threshold amount. A request is received from a user device for weather information for the location. Information relating to the weather event is provided to the user device. Embodiments of the present invention further include a method and program product for providing location-based weather services in substantially the same manner described above. Thus, present invention embodiments provide location-based weather services that notify users of weather phenomena that can impact the users by identifying weather events at a fine level of granularity, increasing the precision of weather services.

Various other embodiments of the present invention will now be discussed. In some embodiments, the information relating to the weather event to the user device includes one or more of: a description of the weather event, a starting time of the weather event, and a duration of the weather event. By providing information about the nature and timing of a weather event, users can more adequately prepare, enabling users to mitigating the impact of weather events. In some embodiments, the one or more weather values include one or more from a group of: current weather values, and forecasted weather values. By comparing current and/or forecasted weather data to baseline weather values for a location, weather transition events and other deviations from the norm can be identified. In some embodiments, the one or more baseline values include one or more from a group of record high values, record low values, average values, predetermined threshold values, and calculated threshold values. By comparing current or forecasted weather data to baseline values such as record highs or lows, averages, or thresholds for a time and location, extreme or unusual weather events can be identified. In some embodiments, the one or more weather values are selected from a group of: a wind chill value, a precipitation value, a heat index value, a visibility value, and a dew point value. Since users may be unfamiliar with the significance of these weather values, present invention embodiments process the weather values to provide actionable notifications to users. In some embodiments, the information relating to the weather event includes a visual indicator associated with a positive or negative impact of the weather transition event. Thus, users can easily observe whether upcoming weather events will be positive or negative and plan accordingly. In some embodiments, the visual indicator comprises a color indicator. By color-coding indicators for weather events, users can rapidly observe which events are associated with positive impacts and which events are associated with negative impacts. In some embodiments, the weather event is selected from a group of: an exposure time of thirty minutes or less to cause frostbite, a wind chill factor that reduces an apparent temperature by seven degrees or more, and a heat index that raises the apparent temperature to 130° F. or higher. Thus, users can adequately prepare for potentially dangerous weather events.

BRIEF DESCRIPTION OF THE DRAWINGS

Generally, like reference numerals in the various figures are utilized to designate like components.

FIG. 2 is a flow chart depicting a method of providing location-based forecasting of weather events based on their impact to users in accordance with an embodiment of the present invention;

DETAILED DESCRIPTION

Figure 1:
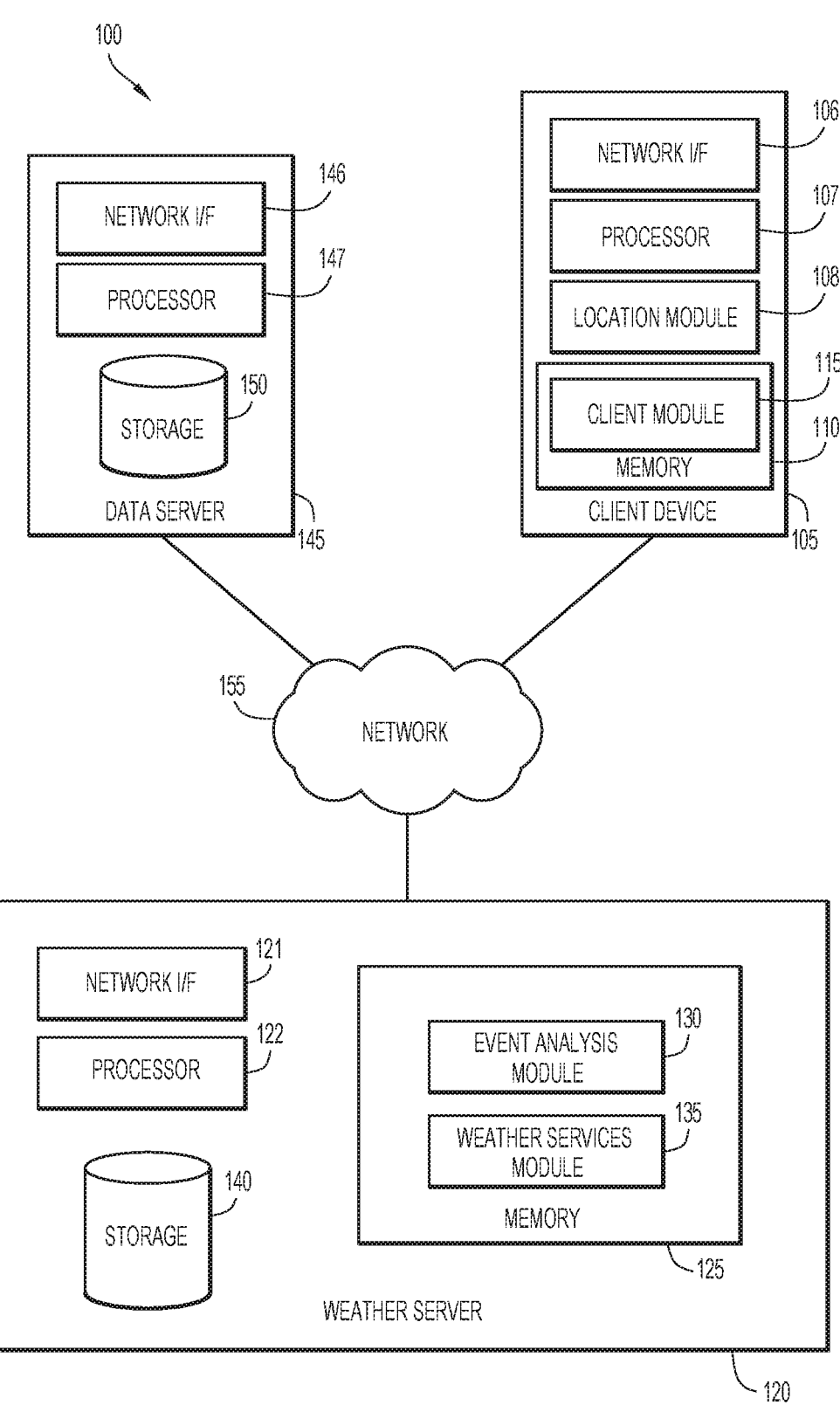
FIG. 1 is a block diagram depicting a computing environment for providing location-based forecasting of weather events based on their impact to users in accordance with an embodiment of the present invention.

Embodiments of the present invention involve a recognition that weather data is typically organized and presented in a manner that requires a user to understand which details are important or relevant. In particular, weather data may be presented in a chronological format, requiring a user to read the entirety of a weather report in order to identify any weather events of relevance to the user. Moreover, users may not be familiar with the significance of some weather metrics, such as dew point or pressure. Thus, a consumer can fail to notice important weather information that may indicate upcoming weather events that can positively or negatively impact the user.

Present invention embodiments relate to location-based weather services, and more specifically, to providing location-based forecasting of weather events based on their impact to users. A weather service typically informs users of current and forecasted weather conditions for a location. However, users may struggle to draw conclusions from presented weather data, such as identifying upcoming weather conditions that can positively or negatively impact the user. Moreover, weather services typically fail to highlight noteworthy weather events, such as unseasonably warm or cold temperatures, sudden or unexpected weather transitions, and the like. For example, a user may cancel his or her morning plans when the user observes a weather icon that indicates rainy conditions, despite the fact that the morning may be pleasant and rain is not expected until the afternoon.

Present invention embodiments provide location-based weather services by identifying good and bad weather situations in a manner that captures a user's attention. In particular, forecasted weather conditions are compared to previous, current, and/or historical weather conditions to identify weather events that would impact users. Additionally, the nature of the impact is determined so that users can be alerted to positive weather events and negative weather events. Thus, present invention embodiments improve weather forecasting technology by providing users with weather insights that enable users to prepare for upcoming weather events that the users would otherwise fail to anticipate. Moreover, invention embodiments improve the field of weather forecasting by processing time-series weather data to identify significant weather events at a finer level of granularity, thereby increasing the precision of weather services.

Various other embodiments of the present invention will now be discussed. In some embodiments, the information relating to the weather event to the user device includes one or more of: a description of the weather event, a starting time of the weather event, and a duration of the weather event. By providing information about the nature and timing of a weather event, users can more adequately prepare, enabling users to mitigating the impact of weather events. In some embodiments, the one or more weather values include one or more from a group of: current weather values, and forecasted weather values. By comparing current and/or forecasted weather data to baseline weather values for a location, weather transition events and other deviations from the norm can be identified. In some embodiments, the one or more baseline values include one or more from a group of record high values, record low values, average values, predetermined threshold values, and calculated threshold values. By comparing current or forecasted weather data to baseline values such as record highs or lows, averages, or thresholds for a time and location, extreme or unusual weather events can be identified. In some embodiments, the one or more weather values are selected from a group of: a wind chill value, a precipitation value, a heat index value, a visibility value, and a dew point value. Since users may be unfamiliar with the significance of these weather values, present invention embodiments process the weather values to provide actionable notifications to users. In some embodiments, the information relating to the weather event includes a visual indicator associated with a positive or negative impact of the weather transition event. Thus, users can easily observe whether upcoming weather events will be positive or negative and plan accordingly. In some embodiments, the visual indicator comprises a color indicator. By color-coding indicators for weather events, users can rapidly observe which events are associated with positive impacts and which events are associated with negative impacts. In some embodiments, the weather event is selected from a group of an exposure time of thirty minutes or less to cause frostbite, a wind chill factor that reduces an apparent temperature by seven degrees or more, and a heat index that raises the apparent temperature to 130° F. or higher. Thus, users can adequately prepare for potentially dangerous weather events.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for providing location-based forecasting of weather events based on their impact to users in accordance with an embodiment of the present invention. As depicted, computing environment 100 includes a client device 105, a weather server 120, a data server 145, and a network 155. It is to be understood that the functional division among components of computing environment 100 have been chosen for purposes of explaining present invention embodiments and is not to be construed as a limiting example.

Client device 105 includes a network interface (I/F) 106, at least one processor 107, a location module 108, and memory 110 that includes a client module 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, a user of client device 105 may access or receive weather data in accordance with present invention embodiments. Client device 105 may include internal and external hardware components, as depicted and described in further detail with respect to FIG. 4.

Location module 108 may include any device capable of determining the location of client device 105. Location may include one or more of address, latitude, longitude, and elevation. In one embodiment, location module 108 receives signals from a global positioning system in order to determine location. In another embodiment, location module 108 uses ground-based or other triangulation techniques to determine location. Location module 108 may share the location of client device 105 with weather server 120.

Client module 115 may include one or more modules or units to perform various functions of present invention embodiments described below. Client module 115 may be implemented by any combination of any quantity of software and/or hardware modules or units, and may reside within memory 110 of client device 105 for execution by a processor, such as processor 107.

Client module 115 enables a user of client device 105 to receive and view weather information, including past, current, and/or forecasted weather conditions for one or more geographical areas. Client module 115 may register with weather services module 135 of weather server 120 in order to receive information. Client module 115 may share location data, obtained via location module 108, with weather server 120 in order to receive location-based weather services. In some embodiments, client module 115 may provide a notification to a user of client device 105 to alert the user of an upcoming positive or negative weather event. Client module 115 may include a graphical user interface for presenting information to a user, such as the interface depicted and described in further detail with respect to FIGS. 3A-3D.

Weather server 120 includes a network interface (I/F) 121, at least one processor 122, memory 125, and storage 140. Memory 125 may include an event analysis module 130 and a weather services module 135. Weather server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of weather server 120 to send and receive data over a network, such as network 155. In general, weather server 120 collects and processes weather data to provide location-based weather services to user devices, such as client device 105. Weather server 120 may include internal and external hardware components, as depicted and described in further detail with respect to FIG. 4.

Event analysis module 130 and/or weather services module 135 may include one or more modules or units to perform various functions of present invention embodiments described below. Event analysis module 130 and/or weather services module 135 may be implemented by any combination of any quantity of software and/or hardware modules or units, and may reside within memory 125 of weather server 120 for execution by a processor, such as processor 122. In various other embodiments, one or more of event analysis module 130 and/or weather services module 135 may be located locally to a client device (e.g., client device 105); in such embodiments, the modules may process data obtained data from weather server 120 in order to perform operations in accordance with present invention embodiments.

Event analysis module 130 may process current and/or forecasted weather data and baseline weather data in order to identify positive and negative weather events. In particular, event analysis module 130 may utilize a rules-based system of identifying weather events and classifying identified weather events as either positive or negative weather events. In some embodiments, event analysis module 130 compares current or forecasted weather conditions to previous or historical weather conditions to identify upcoming weather events whenever there is a deviation from a previous or historical trend that exceeds a threshold. For example, when historical weather data indicates that the temperature for a time and place normally decreases after sunset, but weather forecast data predicts an upcoming temperature increase after sunset, event analysis module 130 may identify a temperature-related weather event.

When event analysis module 130 identifies a weather event, event analysis module 130 may also classify the weather event as either positive or negative, with positive events being associated with favorable or pleasant impacts on users, and negative events being associated with undesirable impacts on users. As an example, positive weather events may include a transition to sunny weather, visibility improving, comfortable sleeping weather, pleasant weekend weather, higher temperatures that remain comfortable, pollen count decreasing, air quality improving, and a lower ultraviolet index. Negative weather events may include upcoming precipitation events, wind chill causing the apparent temperature to decrease by a particular amount, the heat index or humidity index causing the apparent temperature to increase past a particular value, any decrease in temperature that could lead to frostbite or hypothermia in an individual who is exposed to that temperature for a particular amount of time, and the like. Event analysis module 130 may also identify events that are indirectly related to weather, or unrelated to weather, such as events associated with incidence of disease (e.g., influenza outbreaks), dangers posed by natural disasters such as fires, and the like.

In some embodiments, event analysis module 130 processes collected weather data to extract one or more current and/or forecasted weather values for a location, and processes baseline weather data to extract a corresponding one or more baseline values for a location. Event analysis module 130 may then directly compare weather values of the same type to identify weather events. Weather values may include any measurable quality of weather for a location, such as a temperature, humidity, wind speed and/or direction, wind chill, pressure, ultraviolet index, pollen count, air quality index, precipitation type and/or amount, and any other observable data. Baseline weather data may include historical data for a location, such as the average of one or more prior years, record highs or lows, and/or recent measurements observed over a particular amount of time, such as the last hour, the last twelve hours, the last day, and the like. In some embodiments, the baseline weather data may include the climatological normal, which is a thirty-year average of a weather variable. Additionally or alternatively, baseline values may include average values, current weather values, predefined threshold values, or calculated threshold values based on comparisons such as comparing seasonal values to the rest of a year's averages, comparing a location's values to values of locations that have similar climates, and the like. Thus, the baseline weather data is used to establish a baseline set of values to which event analysis module 130 compares current or forecasted values in order to identify weather events when event analysis module 130 detects a delta or deviation from the baseline.

In some embodiments, weather services module 135 identifies a weather event when a forecasted value differs from its corresponding baseline value by an amount that exceeds a threshold. Event analysis module 130 may utilize different thresholds for different weather values. For example, a temperature-related weather event may be identified when the forecasted temperature exceeds the baseline temperature by 20%. In contrast, a precipitation-related weather event may be identified whenever rainfall is expected that exceeds a particular amount in an hour. Some weather events may be based solely on the magnitude of forecasted weather values, as the baseline value may be zero. For example, on a given day, climatological normals may suggest that freezing rain is unlikely, so any amount of freezing rain may be identified as a weather event.

The current and/or forecasted weather data and baseline weather data may both include time-series data, so that event analysis module 130 can determine a time and/or duration of identified weather events. Weather events can thus be described in terms of a start time, end time, and/or duration. Event analysis module 130 may employ a rules-based system to categorize identified weather events as either positive or negative events based on the type or category of each event.

In some embodiments, event analysis module 130 may process current and/or forecasted weather data to identify weather events according to a predefined set of rules, such as the rules in Table 1.

TABLE 1

| Rule | Text to Display |
| --- | --- |
| Freezing Rain >= 0.00" in 1 hour | % Freezing Rain Amount % of freezing rain will make roads slippery. |
| Snow >= 1" in 1 hour | Heavy snowfall: % Snow Amount % |
| Snow >= .1" in 1 hour | Accumulating snow expected: % Snow Amount % |
| Sleet > 0.00" in 1 hour | Sleet is expected. |
| Rain >= 1.0" in 1 hour | Rainfall of % Rain Amount % per hour will make driving difficult. |
| Rain >= 0.3" in 1 hour | % Rain amount % of rain |
| Rain >= 0.02" in 1 hour | % Rain amount % of rain |
| Snow >= 6" in 1 day | Get ready to shovel! % Snow Amount % expected % Day of Week %. |
| Snow >= 3" in 1 day | % Snow Amount % expected % Day of Week %. |
| Snow >= 1" in 1 day | % Snow Amount % expected % Day of Week %. |
| Rain >= 5.0" in 1 day | Significant rainfall expected with % Rain Amount % forecast for % Day of Week %. |
| Rain >= 1.0" in 1 day | Heavy rainfall expected % Day of Week %: % Rain Amount % |
| Rain >= 0.10" in 1 day | % Rain Amount % of rain expected % Day of Week %. |
| Freezing Rain >= 0.5" in 1 day | Power outages are likely because of % Freezing Rain Amount % of freezing rain. |
| Freezing Rain >= 0.25" in 1 day | Power outages are possible because of % Freezing Rain Amount % of freezing rain. |
| 0.00" < Freezing rain < 0.25" in 1 day | Driving conditions will be dangerous with % Freezing Rain Amount % of freezing rain on % Day of Week %. |
| Sleet > 0.00" in 1 day | % Amount of Sleet % is forecast for % Day of Week %. |
| Frostbite Time of <= 5 minutes | Wind chill of % Wind Chill Temperature % means frostbite could occur in less than 5 minutes. https://www.weather.gov/bou/windchill Write safety tips? |
| Frostbite Time of <= 10 minutes | Wind chill of % Wind Chill Temperature % means frostbite could occur in less than 10 minutes. https://www.weather.gov/bou/windchill Write safety tips? |
| Frostbite Time of <= 30 minutes | Wind chill of % Wind Chill Temperature % means frostbite could occur in less than 30 minutes. https://www.weather.gov/bou/windchill Write safety tips? |
| Temperature - wind chill >= 7 Any wind chill: Highlight only when wind chill temperature is greater than 7 degrees below the current temperature (for example: highlight wind chill when temperature is 30 and wind chill is 22 or less) | Feels like temperature of % Wind Chill Temperature %. |
| Heat Index >= 130° F. | Heat Index of % Heat Index Temperature % means heatstroke or sunstroke HIGHLY LIKELY if outdoors for a long period of time. Drink plenty of water and reduce outdoor physical activity. |
| 105° F. <= Heat Index <= 129° F. | Heat Index of % Heat Index Temperature % means sunstroke, heat cramps or heat exhaustion are LIKELY. Heatstroke is POSSIBLE if you are physically active outdoors for a long time. |
| Heat index - temperature >= 7 Any heat index: Highlight only when heat index temperature is greater than 7 degrees above the current temperature (for example: highlight heat index when the temperature is 80 and the heat index is 87 or higher) | Feels like temperature of % Heat Index Temperature % |
| Wind Speed >= 157 mph | Wind speed: % Wind Speed %. The wind speed is the same as a Category 5 Hurricane. Catastrophic damage will occur with significant damage to homes, power outages which could last weeks and will make this location temporarily uninhabitable. |
| 130 <= Wind Speed <157 mph | Wind speed: % Wind Speed %. The wind speed is the same as a Category 4 Hurricane. Catastrophic damage will occur with structural damage to homes, power outages are likely and most locations nearby could become temporarily uninhabitable. |

TABLE 1-continued

| Rule | Text to Display |
| --- | --- |
| 111 <= Wind Speed <130 mph | Wind speed: % Wind Speed %. The wind speed is the same as a Category 3 Hurricane. Well-built homes could be damaged with power outages possible due to trees being uprooted or snapped. |
| 96 <= Wind Speed <111 mph | Wind speed: % Wind Speed %. The wind speed is the same as a Category 2 Hurricane. Well-built homes could have roof and siding damage. Trees with a weak root-structure could be uprooted and snapped trees could lead to power outages. |
| 74 <= Wind Speed <96 mph | Wind speed: % Wind Speed %. The wind speed is the same as a Category 1 Hurricane. Well-built homes could have roof and siding damage. Large branches could snap and trees with shallow roots could be uprooted and lead to power outages. |
| Wind Speed >= 40 mph | Wind speed: % Wind Speed %. Bring in or secure any loose outside items which could be carried by the wind. Driving in trucks and buses is difficult. |
| 30 <= Wind Speed <40 mph | Wind speed: % Wind Speed %. Small items outside could be blown around by the wind. Driving in trucks and buses could be difficult. |
| 15 <= Wind Speed <30 mph | Breezy |
| Dew Point >= 80° F. | Dew Point: % Dew Point %. The air feels oppressive and dangerous for people with asthma related illnesses. |
| 75° F. <= Dew Point <80° F. | Dew Point: % Dew Point %. The air feels extremely uncomfortable. |
| 70° F. <= Dew Point <75° F. | Dew Point: % Dew Point %. The air feels humid and uncomfortable. |
| 65° F. <= Dew point <70° F. | Dew Point: % Dew Point %. The air feels sticky. |
| 60° F. <= Dew point <65° F. | Dew Point: % Dew Point %. The air might feel a little sticky. |
| Forecast temperature is above record high | Forecast temperature is above record high |
| Forecast temperature is below record low | Forecast temperature is below record low |
| Temperature is <5° F. above or below record | Temperature is <5° F. above or below record |
| Temperature is 15° F. above or below normal | Temperature is 15° F. above or below normal |
| High Temperature occurs before noon or after 6 pm local time | High Temperature occurs before noon or after 6 pm local time |
| Low Temperature occurs after 10 AM and before midnight | Low Temperature occurs after 10 AM and before midnight |
| Hourly temperature change from hour x to x + 1 > −10° F. | Temperature dropping 10 degrees in one hour |
| Hourly temperature change from hour x to x + 1 > +10° F. | Temperature increasing 10 degrees in one hour |
| High temperature change from day x to x + 1 > −15° F. | Temperature decreasing 15 degrees in 1 day |
| High temperature change from day x to x + 1 > +15° F. | Temperature increasing 15 degrees in one day |
| Visibility <⅛ mile | Dense fog |
| Visibility <1 mile | Foggy |

Table 1 also includes examples of text for each weather event that is displayed to a user of client device 105 in order to draw the user's attention to the weather event.

Weather services module 135 may manage devices, such as a client device 105, in order to share weather-related information with subscribed devices. In some embodiments, weather services module 135 provides responses to requests for weather data from an application, such as client module 115 of a client device 105. A requesting application may indicate one or more locations of interest. In some embodiments, client module 115 may request weather data for a location indicated by location module 108. Weather services module 135 may provide weather data to client device 105 that includes a weather forecast and indications of positive and negative weather events identified by event analysis module 130, including the timing of each event (e.g., duration, start time, etc.), and a description of each event. In some embodiments, weather services module 135 registers devices with weather server 120 and provides regular updates of weather-related information to devices. Weather services module 135 may transmit information to devices, such as client device 105, that causes each device to generate an alert or notification in response to event analysis module 130 identifying an upcoming weather event in a location associated with the device.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data in storage 140 may conform to any suitable storage architecture known in the art, such as a file, a relational database, an object-oriented database, and/or one or more tables. In some embodiments, storage 140 may store data relating to weather for one or more locations, including weather data collected via past or present measurements, data associated with weather forecasts, and any data related to weather events.

Data server 145 includes a network interface (I/F) 146, at least one processor 147, and storage 150. Data server 145 may include a laptop computer, a tablet computer, a netbook computer, a personal computer (PC), a desktop computer, a personal digital assistant (PDA), a smart phone, or any programmable electronic device capable of executing computer readable program instructions. Network interface 146 enables components of data server 145 to send and receive data over a network, such as network 155. In general, data server 145 may store current and/or historical weather data for one or more locations. Additionally or alternatively, data server 145 may store weather forecast data that has been generated for one or more locations. Data server 145 may include internal and external hardware components, as depicted and described in further detail with respect to FIG. 4.

Storage 150 may include any non-volatile storage media known in the art. For example, storage 150 can be implemented with a tape library, optical library, one or more independent hard disk drives, or multiple hard disk drives in a redundant array of independent disks (RAID). Similarly, data in storage 150 may conform to any suitable storage architecture known in the art, such as a file, a relational database, an object-oriented database, and/or one or more tables. Storage 150 may store any data, including current and/or historical weather data for one or more locations, and/or weather forecast data for one or more locations. Stored current and/or historical weather data may include data that has been collected via one or more entities and aggregated at data server 145. Stored weather forecast data may include any data produced by one or more meteorological forecasting models. A meteorological forecasting model may process current and/or historical weather data to generate forecasts using conventional or other forecasting techniques, including models that employ machine learning-based approaches. Storage 150 may be accessible by weather server 120 and its models in order for weather server 120 to obtain data for identifying weather events.

Network 155 may include a local area network (LAN), a wide area network (WAN) such as the Internet, or a combination of the two, and includes wired, wireless, or fiber optic connections. In general, network 155 can be any combination of connections and protocols known in the art that will support communications between client device 105, weather server 120, and/or data server 145 via their respective network interfaces in accordance with embodiments of the present invention.

FIG. 2 is a flow chart depicting a method 200 of providing location-based forecasting of weather events based on their impact to users in accordance with an embodiment of the present invention.

An indication of one or more locations is received at operation 210. A user of client device 105 may select one or more locations for which the user would like to receive location-based services. A location may include a current location (e.g., as determined according to location module 108 of client device 105) and/or other locations, such as a particular zip code, city, county, state, or other geographical description.

Weather data and baseline weather data are collected at operation 220. Event analysis module 130 may obtain data from one or more locations, such as storage 140 of weather server 120 and/or external network-accessible locations, such as storage 150 of data server 145. The weather data may include current and/or forecasted weather data, and baseline weather data may include values such as record high values, record low values, average values, predetermined threshold values, and calculated threshold values. The weather data and/or the baseline weather data may be produced by one entity or produced by multiple entities and aggregated.

The collected weather data is processed to identify weather values for one or more locations at operation 230. Event analysis module 130 may process current, forecasted, and/or historical weather data to extract weather values for particular times (e.g., times of day, times of year, etc.). Weather values may include any measurable quality for a location, such as a temperature value, a humidity value, a wind speed and/or direction, a wind chill value, an atmospheric pressure value, an ultraviolet index value, a pollen count value, an air quality index value, a precipitation type and/or amount, and any other observable data. As current, forecasted, and/or historical weather data may be time-series data, each weather value may be associated with a particular time, such as a time of day or time of year. Extracted weather values may further include baseline values for each location at a particular time of day and/or year.

The one or more weather values are compared to corresponding baseline values for the location at operation 240. Event analysis module 130 may process current or forecasted weather data to extract weather values for current or future weather, such as a current or forecasted temperature value, a current or forecasted humidity value, a current or forecasted wind speed and/or direction, a current or forecasted wind chill value, a current or forecasted atmospheric pressure value, a current or forecasted ultraviolet index value, a current or forecasted pollen count value, a current or forecasted air quality index value, a current or forecasted precipitation type and/or amount, and any other current or forecasted weather values. Forecast values may be compared to the baseline values for a location to identify weather events.

Operation 250 determines whether the difference between a weather value and its corresponding baseline value exceeds a predetermined threshold. Event analysis module 130 may perform a one-to-one comparison of a weather value to a baseline weather value, calculating the difference between compared values. A difference in values may be represented as a percentage difference, a ratio, a standard deviation of the forecast value from the baseline weather value, and the like. Event analysis module 130 then compares the difference to a predetermined threshold value to determine if the weather value's deviation from the baseline is sufficient to indicate a weather event. Additionally or alternatively, event analysis module 130 may analyze forecast values using a rules-based approach, such as the example set of rules in Table 1.

If event analysis module 130 determines that a forecast value indicates a weather event, then the weather event is identified at operation 260. If not, then method 200 may proceed to operation 270 and provide a user with other weather information for the user's identified one or more locations. When event analysis module 130 identifies a weather event, event analysis module 130 may determine the nature of the impact of the event (e.g., positive or negative) using a rules-based approach, as well as determine the timing of the event (e.g., a start time, a duration, etc.).

Information relating to the weather event is transmitted to a client device at operation 270. When a user device, such as client device 105, requests weather information for a location, weather services module 135 may respond to the request with information relating to the identified weather event and optionally, other weather information. In some embodiments, user devices may subscribe to a weather service of weather server 120, and weather services module 135 may accordingly make information relating to weather events available to subscribed devices as the information becomes available.

FIGS. 3A-3D are block diagrams depicting user interfaces 300, 325, 350, and 375 in accordance with embodiments of the present invention. User interfaces 300, 325, 350, and/or 375 may be presented on a user device, such as client device 105.

Figure 3A:
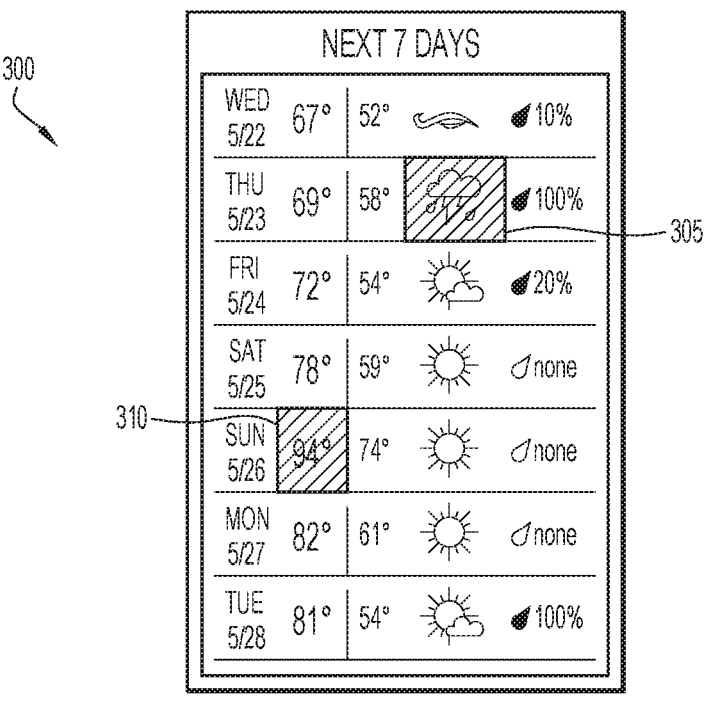
FIGS. 3A-3D are block diagrams depicting user interfaces in accordance with an embodiment of the present invention.

FIG. 3A depicts user interface 300 in which information provided by a location-based weather service is presented to a user in accordance with an embodiment of the present invention. As depicted, user interface 300 includes a seven-day forecast for a location, including temperature highs and lows, icons depicting weather conditions, and precipitation chances. Additionally, two weather events 305 and 310 are highlighted for a user. Highlighted weather events 305 and 310 may indicate negative weather events and may accordingly be highlighted in a color such as red to draw a user's attention. For example, weather event 305 may represent a thunderstorm that is of notable severity, duration, rainfall amount, and the like, and weather event 310 may represent a high temperature that exceeds the baseline by a particular threshold amount.

Figure 3B:
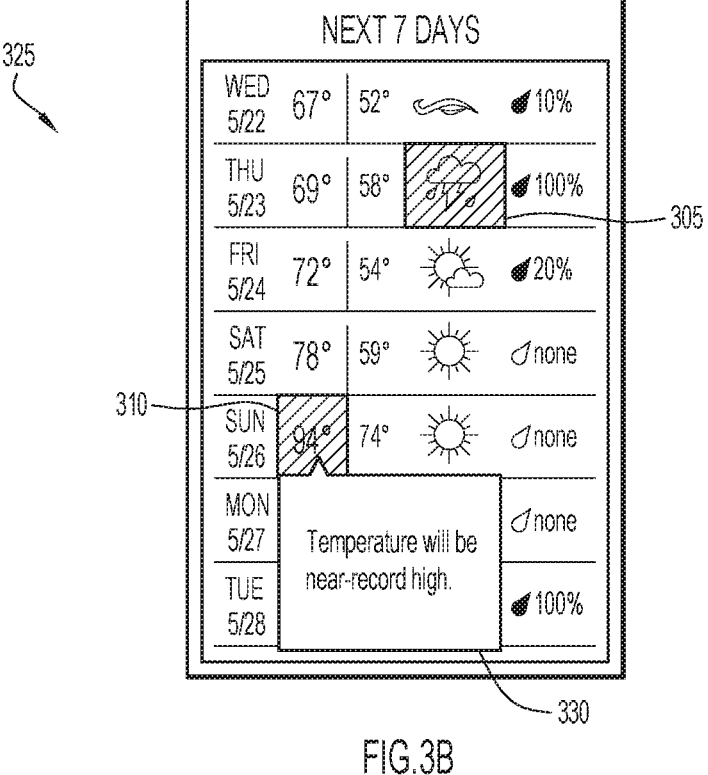

FIG. 3B depicts user interface 325 in which information relating to weather event 310 is presented to a user via interface element 330. A user may interact with weather event 310 to cause interface element 330 to appear, or interface element 330 may present the information automatically, e.g., after a specified amount of time.

Figure 3C:
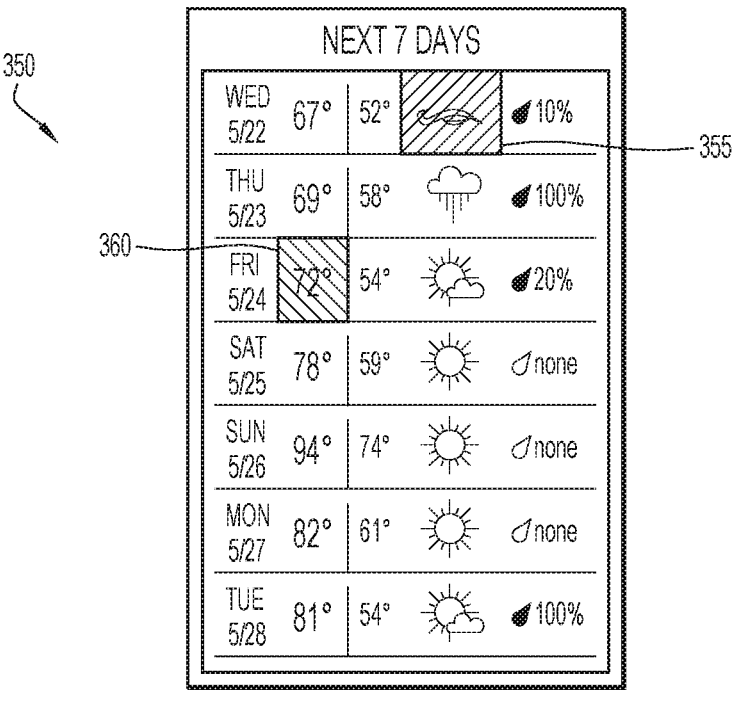

FIG. 3C depicts user interface 350, which includes a seven-day forecast for a location, and weather events 355 and 360. Weather event 355 may include a windy weather event that can be identified by comparing forecasted wind velocities to baseline values. Weather event 355 may be highlighted in a color such as red to indicate that it is a negative weather event. In contrast, weather event 360 may represent a positive weather event, and may accordingly be highlighted in a color such as green to indicate such. Alternatively, weather events may be presented as positive or negative based on hatching, symbols, animations, or other indicators. In the example depicted in user interface 350, weather event 360 may be identified as a positive weather event because a transition to good weather occurs on that day.

Figure 3D:
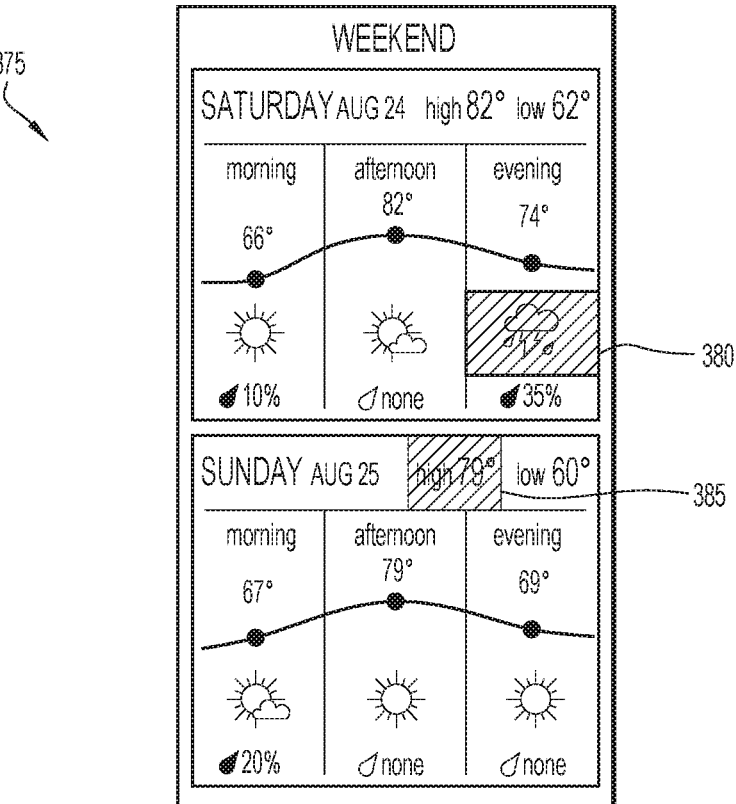

FIG. 3D depicts user interface 375, which includes a weekend forecast for a location, with weather events 380 and 385 highlighted for a user. Weather event 380 may be depicted using a negative indicator to inform a user that a forecasted thunderstorm may impact the user's weekend activities. Similarly, weather event 385 may be depicted using a negative indicator to inform the user that the high temperature will be significantly lower than normal for that time of year.

Figure 4:
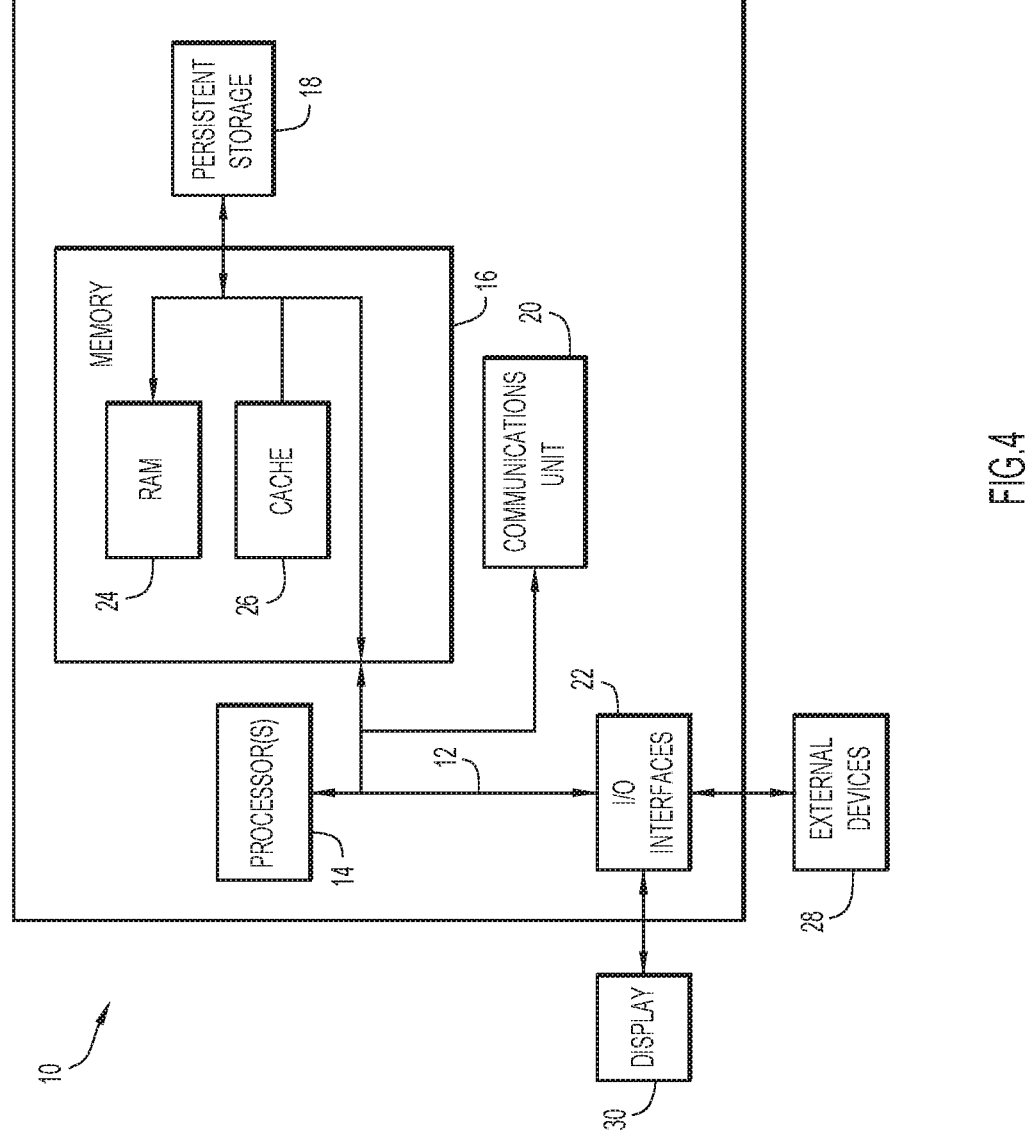
FIG. 4 is a block diagram depicting a computing device in accordance with an embodiment of the present invention.

FIG. 4 is a block diagram depicting components of a computer 10 suitable for executing the methods disclosed herein. Computer 10 may implement client device 105, weather server 120, and/or data server 145 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to location-based forecasting of weather events (e.g., current weather data, historical weather data, forecasted weather data, weather event identification and classification data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, weather server 120, and/or data server 145 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to location-based forecasting of weather events (e.g., current weather data, historical weather data, forecasted weather data, weather event identification and classification data, etc.) may include any information provided to, or generated by, client device 105, weather server 120, and/or data server 145. Data relating to location-based forecasting of weather events may include any desired format and arrangement, and may include any quantity of any types of fields of any size to store any desired data. The data relating to location-based forecasting of weather events may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to location-based forecasting of weather events), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing location-based forecasting of weather and other events.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 115, event analysis module 130, weather services module 135, etc.). These systems may include any types of monitors and input devices (e.g., keyboard, mouse, voice recognition, etc.) to enter and/or view information.

It is to be understood that the software (e.g., communications software, server software, client module 115, event analysis module 130, weather services module 135, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client module 115, event analysis module 130, weather services module 135, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardware, wireless link, Intranet, etc.).

The system may employ any number of any conventional or other databases, data stores or storage structures (e.g., files, databases, data structures, data or other repositories, etc.) to store information (e.g., data relating to location-based forecasting of weather events). The database system may be implemented by any number of any conventional or other databases, data stores or storage structures (e.g., files, databases, data structures, data or other repositories, etc.) to store information (e.g., data relating to location-based forecasting of weather events). The database system may be included within or coupled to the server and/or client systems. The database systems and/or storage structures may be remote from or local to the computer or other processing systems, and may store any desired data (e.g., data relating to location-based forecasting of weather events).

The present invention embodiments may employ any number of any type of user interface (e.g., Graphical User Interface (GUI), command-line, prompt, etc.) for obtaining or providing information (e.g., data relating to location-based forecasting of weather events), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, predicting future events that represent deviations from recent or historical trends, and communicating information relating to future events in a manner that draws a user's attention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for determining location-based weather services, the method comprising:

receiving weather data about a location of interest for location-based weather services;

determining weather values for the location for each time period in a set of time periods based on the weather data;

identifying weather events for the location based on the weather values;

generating weather information for the location for presentation in a graphical user interface (GUI) that is displayed at user devices that request the location-based weather services for the location;

processing the identified weather events to generate additional weather information for the location that indicates an impact of the identified weather events using a rules-based approach, wherein the additional weather information corresponding to a particular weather event of the identified weather events and the additional weather information provides information to draw attention to the impact of the particular weather event by explaining both:

a quantified significance of the weather values for the particular weather event, and an explanation of predicted real world impacts of the particular weather event on the location, and recommendations for preparing for the predicted real world impacts;

transmitting the weather information and the additional weather information for the location to the user devices, wherein the weather information includes visual indicators corresponding to the identified weather events that are presented in a same view of the GUI displayed at the user devices;

causing, in response to receiving user selection of a visual indicator amongst the visual indicators, rendering of the additional weather information associated with the user selected visual indicator to be presented within the same view of the GUI; and causing, in response to determining that the visual indicator has remained unselected for a threshold duration, automatic rendering of the additional weather information as a partial overlay that obscures a portion of the weather information while maintaining visibility of the visual indicators presented in the GUI.

2. The method of claim 1, wherein the set of time periods comprises times of day.

3. The method of claim 1, wherein the set of time periods comprises times of year.

4. The method of claim 1, wherein the weather values comprise one or more of: a temperature value, a humidity value, a wind speed value, a wind direction value, a wind chill value, an atmospheric pressure value, an ultraviolet index value, a pollen count value, an air quality index value, a precipitation type, and a precipitation amount.

5. The method of claim 1, further comprising:

determining, for each of the weather values, a difference between the weather values for the location and corresponding baseline weather data for the location, wherein the difference between the weather values for the location and the corresponding baseline weather data for the location comprises a standard deviation of the weather values from the corresponding baseline weather data.

6. The method of claim 5, further comprising:

determining whether the difference between the weather values for the location and the corresponding baseline weather data for the location exceeds a predetermined threshold; and in response to determining that the difference between the weather values for the location and the corresponding baseline weather data for the location does not exceed the predetermined threshold, transmitting other weather information for the location to the user devices that request the location-based weather services for the location.

7. The method of claim 6, wherein in response to determining that the difference between the weather values for the location and the corresponding baseline weather data for the location exceeds the predetermined threshold, the method comprises: determining a nature of impact of the weather events on the location.

8. The method of claim 6, wherein in response to determining that the difference between the weather values for the location and the corresponding baseline weather data for the location exceeds the predetermined threshold, the method comprises: determining a start time of the weather events.

9. The method of claim 6, wherein in response to determining that the difference between the weather values for the location and the corresponding baseline weather data for the location exceeds the predetermined threshold, the method comprises: determining a duration of the weather events.

10. The method of claim 6, wherein the predetermined threshold is defined in a set of rules, wherein each rule in the set of rules identifies a type of weather event, a value for the type of weather event for a predetermined period of time, and text information to display at the user devices in response to determining that the weather values for the location exceeds the value for the corresponding type of weather event for the predetermined period of time.

11. The method of claim 10, wherein the type of weather event comprises at least one of rain, freezing rain, snow, sleet, frostbite, temperature, wind chill, heat index, wind speed, dew point, or limited visibility.

12. The method of claim 1, wherein the visual indicators of the identified weather events are presented concurrently in the GUI with other weather information.

13. The method of claim 12, wherein the visual indicators of the identified weather events are presented in a first indicia and the other weather information is presented in a second indicia.

14. The method of claim 13, wherein the first indicia is different than the second indicia and the first indicia is configured to draw the corresponding users attention to the visual indicators of the identified weather events for the location.

15. The method of claim 12, wherein presenting the visual indicators of the identified weather events comprises presenting a notification about conditions to expect at the location as a result of the identified weather events.

16. The method of claim 15, wherein the notification comprises at least one of: roads being slippery, a driving conditions difficulty level, a need to shovel, a likeliness of power outages, a likeliness of frostbite, a likeliness of heat stroke, a need to hydrate, a need to reduce outdoor physical activity, a likeliness of heat cramps or exhaustion, a likeliness of damage from high winds, or a likeliness of fog.

17. A system for determining location-based weather services, the system comprising:
an event analysis software module that is programmed to:
receive weather data about a location of interest for location-based weather services;
determine weather values for the location for each time period in a set of time periods based on the weather data;
identify weather events for the location based on the weather values
generate weather information for the location for presentation in a graphical user interface (GUI) that is displayed at user devices that request the location-based weather services for the location;

process the identified weather events to generate additional weather information for the location that indicates an impact of the identified weather events using a rules-based approach, wherein the additional weather information corresponding to a particular weather event and the additional weather information provides information to draw attention to the impact of the particular weather event by explaining both:
a quantified significance of the weather values for the particular weather event, and
an explanation of predicted real world impacts of the particular weather event on the location, and
recommendations for preparing for the predicted real world impacts;
transmit the weather information and the additional weather information for the location to the user devices, wherein the weather information includes visual indicators corresponding to the identified weather events that are presented in a same view of the GUI displayed at the user devices;
cause, in response to receiving user selection of a visual indicator amongst the visual indicators, rendering of the additional weather information associated with the user selected visual indicator to be presented within the same view of the GUI; and
cause, in response to determining that the visual indicator has remained unselected for a threshold duration, automatic rendering of the additional weather information as a partial overlay that obscures a portion of the weather information while maintaining visibility of the visual indicators presented in the GUI.

18. The system of claim 17, wherein the event analysis software module is further programmed to:
determine a difference between the weather values for the location and corresponding baseline weather data for the location exceeds a predetermined threshold; and
in response to determining that the difference between the weather values for the location and the corresponding baseline weather data for the location exceeds the predetermined threshold, determining an impact of the weather events on the location.

19. The system of claim 17, wherein the event analysis software module is further programmed to:
determine a difference between the weather values for the location and corresponding baseline weather data for the location exceeds a predetermined threshold; and
in response to determining that the difference between the weather values for the location and the corresponding baseline weather data for the location exceeds the predetermined threshold, determining timing information of the weather events.

20. The system of claim 17, wherein the visual indicators of the identified weather events are presented concurrently in the GUI with other weather information.

* * * * *